(No Model.)
O. H. PICHER.
METHOD OF TREATING COMPLEX ORES OF LEAD AND ZINC.
No. 554,725.                                  Patented Feb. 18, 1896.
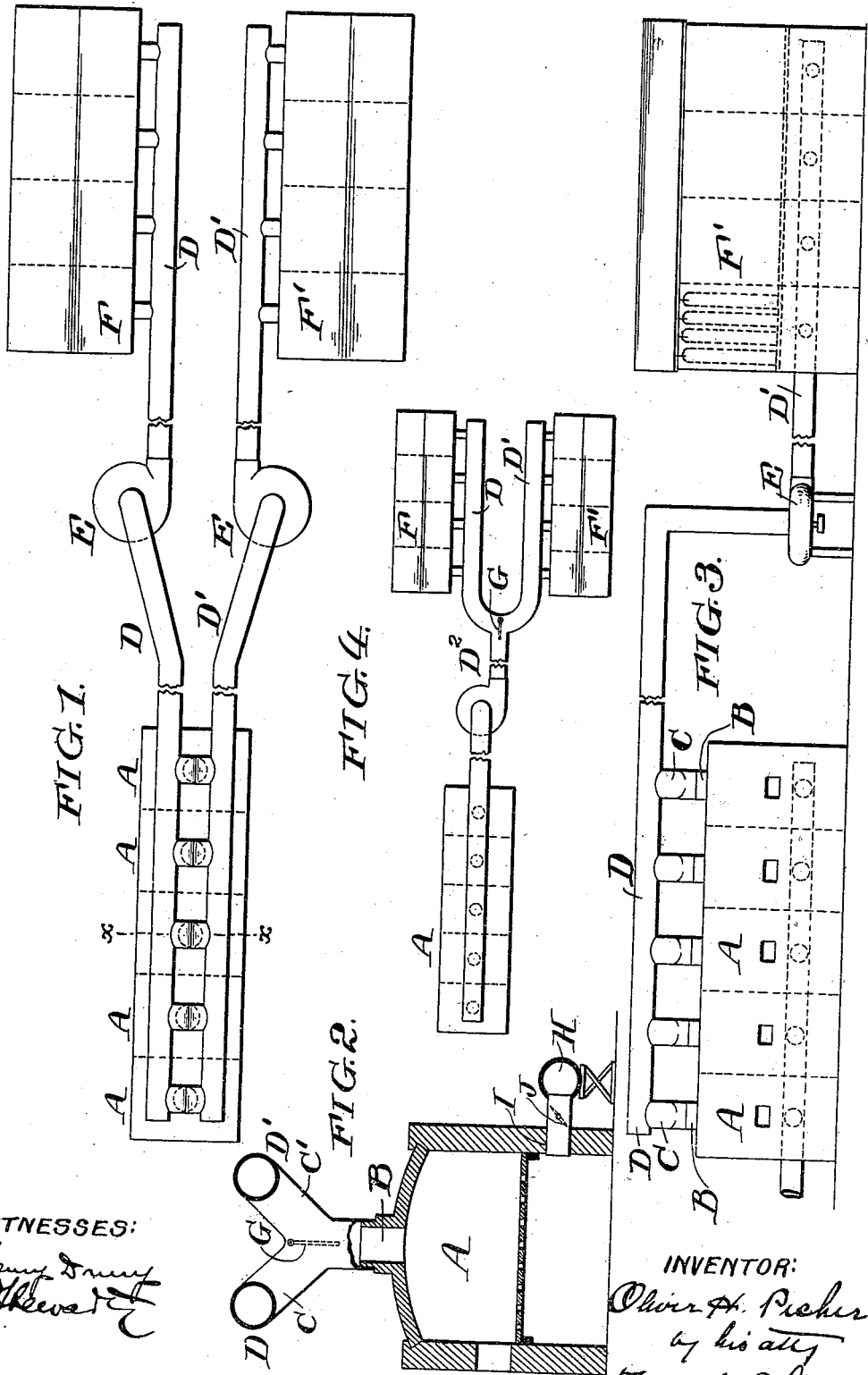

UNITED STATES PATENT OFFICE.

OLIVER H. PICHER, OF JOPLIN, MISSOURI.

METHOD OF TREATING COMPLEX ORES OF LEAD AND ZINC.

SPECIFICATION forming part of Letters Patent No. 554,725, dated February 18, 1896.

Application filed December 23, 1892. Serial No. 456,161. (No specimens.)

*To all whom it may concern:*

Be it known that I, OLIVER H. PICHER, a citizen of the United States, residing in the city of Joplin, county of Jasper, and State of Missouri, have invented an Improved Method for Treating Complex Ores of Lead and Zinc, of which the following is a true and exact description, reference being had to the accompanying drawings, which form a part of this specification.

My invention relates to the treatment of complex ores containing lead and zinc, generally in the form of sulphides and generally in admixture with copper pyrites, some silver and gold, arsenic compounds, and more or less of other ingredients. These ores have been treated in various ways for the extraction and utilization of their metallic contents, and among other methods of treatment the ores have been treated in admixture with carbon in compound reducing and oxidizing furnaces of the Wetherill type, in which the lead and a large quantity of the zinc present are driven off in the form of fumes, which are caught in the screens and subsequently utilized either as the basis of pigment or in a blast-furnace or otherwise for the extraction of the metal. The cinder left in the furnace containing most of the precious metals, together with some zinc and other ingredients, is subjected to further treatment for the extraction of the precious metals. Another method of treating such ores is described in my former patent, No. 469,269, of February 23, 1892. By this plan the complex ore in admixture with carbon is first smelted in a furnace, the temperature of which is maintained at a point below that necessary to volatilize the zinc, and for the purpose of extracting the lead contents of the ore, partly as metal and partly in the form of fume. The residue from the first furnace is then treated in admixture with carbon in compound reducing and oxidizing furnaces to drive off the zinc in the form of fume, this fume of zinc oxide being caught in separate screens, and the result of this treatment, so far as the fumes are concerned, is the production, first, of a fume containing very little zinc and consisting almost entirely of lead, and, in the second place, the production of a fume chiefly composed of zinc oxide.

Now I have ascertained that in the treatment of these complex ores of lead and zinc the lead is volatilized, and volatilized with substantial completeness, at a much lower temperature than that necessary to volatilize any of the zinc, and that when a charge of the complex ore is under treatment, even under ordinary conditions, its lead contents are substantially all driven off before any considerable amount of zinc is volatilized, and, further, that this step-by-step action, driving off first the lead and then the zinc, can be made much more marked by regulating the temperature of the furnaces, which can be easily done by regulating the furnace-blast, so that the ore is first treated at temperatures sufficient to volatilize the lead contents and not high enough to volatilize the zinc contents, and then the temperature of the furnace raised to a point at which the zinc contents will be rapidly volatilized, and I effect a substantial separation of the lead and zinc fumes by carrying the fumes first driven off from the furnace through one screen system and the zinc fumes last driven off through another screen system.

I prefer, in carrying out my present invention, to employ a compound reducing and oxidizing furnace of the Wetherill type, and have indicated such a furnace in the drawings, which illustrate a convenient way in which my invention can be practiced, and in which—

Figure 1 is a plan view of an apparatus adapted for use with my invention; Fig. 2, a cross-section on the line *x x* of Fig. 1; Fig. 3, an elevation, and Fig. 4 a view illustrating a modification in the conduit system.

A A, &c., indicate a row of reducing and oxidizing furnaces of the Wetherill type, each opening provided with a conduit B, from which conduit lead two separate conduits C and C', connecting respectively with flues D and D'. A valve G is provided, by means of which the passage B is made to connect with the conduit C and flue D or with the conduit C' and the flue D' at will.

E E, &c., indicate fans by which the gases, &c., from the furnaces are drawn through the flues D and D', which are made of such length and character as to serve as connecting a force from said flues into the screen system indicated at F F, &c., connected with the flue D or with the screen system F' F' connected with the flue D'.

Instead of making each furnace connectible at will with either the flue D or the flue D' the whole series of furnaces may be connected with flue $D^2$, as indicated in Fig. 4, and this flue connected with the flues D or D' at will by means of a valve G.

The operation of the apparatus as indicated in Figs. 1, 2, and 3 is as follows: The complex ore in admixture with carbon is charged into the furnace A and ignited, the draft of the furnace being regulated by means of the valve G, so that the temperature will not rise to a point at which any considerable amount of zinc is volatilized, and I have ascertained that temperature indicated by a cherry-red will be sufficient for a substantially complete volatilization of the lead sulphide and will not produce any substantial fume of zinc. The lead fumes driven off are carried to one of the flues D or D' and through it to the connected screen system, where the fume is collected for further use after the lead is substantially eliminated from the ore. The valve G is turned so as to connect the other flue, D, for instance, with the furnace. The blast is then increased and the temperature of the furnace raised to a point at which the volatilization of the zinc will be effected. A bright-red heat indicates a sufficient temperature to produce this effect, and the zinc fumes are collected in the other screen system connected with the appropriate flue.

If the ore under treatment is one containing precious metals in valuable quantity, they will be found for the most part in the cinder, which can be treated for their extraction, and the lead or zinc fumes are of course subjected to such additional or further treatment as will fit them for the purposes for which they are intended.

Having now described my invention, what I claim as new, and desire to secure by Letters Patent, is—

The method of treating complex ores of lead and zinc which consists in treating such ores in admixture with carbon in a compound reducing and oxidizing furnace, first at a temperature sufficient to volatilize the lead contents but not to drive off the zinc in quantities and catching the lead fume in a screen system and then raising the temperature of the furnace-charge to a point where zinc is readily volatilized and catching the zinc fume drawn off in a separate screen system.

OLIVER H. PICHER.

Witnesses:
C. V. PETRAMS,
W. A. HACKER.